United States Patent [19]

Davidse et al.

[11] 3,755,123

[45] Aug. 28, 1973

[54] METHOD FOR SPUTTERING A FILM ON AN IRREGULAR SURFACE

[75] Inventors: Pieter D. Davidse, Maarn, Netherlands; Joseph S. Logan; Fred S. Maddocks, both of Poughkeepsie, N.Y.

[73] Assignee: International Business Machines Corporation, Armonk, N.Y.

[22] Filed: Mar. 30, 1971

[21] Appl. No.: 129,419

Related U.S. Application Data

[63] Continuation-in-part of Ser. No. 742,297, July 3, 1968, abandoned.

[52] U.S. Cl. .................................. 204/192, 204/298

[51] Int. Cl. .......................................... C23c 15/00

[58] Field of Search ............................ 204/162, 298

[56] References Cited

UNITED STATES PATENTS

| | | | |
|---|---|---|---|
| 3,616,403 | 10/1971 | Collins et al. | 204/192 |
| 3,461,054 | 8/1969 | Uratny | 204/192 |
| 3,671,459 | 11/1971 | Logan | 204/192 |

*Primary Examiner*—John H. Mack
*Assistant Examiner*—Sidney S. Kanter
*Attorney*—Hanifin & Jancin and Wolmar J. Stoffel

[57] ABSTRACT

A film of substantially uniform thickness is sputtered on an irregular surface of a substrate by inducting a negative voltage on the surface of the film as it is deposited. Controlling the negative voltage results in deposition of a dielectric film that has good edge coverage properties.

7 Claims, 4 Drawing Figures

INVENTORS
PIETER D. DAVIDSE
JOSEPH S. LOGAN
FRED S. MADDOCKS

BY Wolmar J. Stoffel
ATTORNEY

METHOD FOR SPUTTERING A FILM ON AN IRREGULAR SURFACE

This application is a continuation in part of our earlier filed application Ser. No. 742,297 filed July 3, 1968 now abandoned.

In forming integrated monolithic circuit devices and thin film circuit devices, RF sputtered insulating films have been utilized to insulate metal line crossovers and to seal the devices. However, these sputtered insulating films have been subjected to edge attack whereby the film has lost its insulating properties since it ceased to protect the edges of the metal conductor lines. This resulted in poor yield and reliability in the prior art devices which utilized sputtered insulating films.

Edge failure of the insulating film or coating results because the thickness is not uniform over the entire surface upon which the film or coating is deposited. This has been due to the irregular surface of the substrate as for example, the steps produced by the metal conductor lines, preventing a relatively smooth substrate surface from being presented. This has resulted in various portions of the insulating film being relatively thin in comparison with the remainder of the sputtered coating. Fissues have been observed in sputtered films which extend toward the edges of metal stripes. These fissures may extend part way or completely through the film and present a serious problem.

As a result, when various etching solutions have been utilized such as to remove photoresist residue, for example, they have attacked the thinnest portion of the film. This causes these relatively thin portions of the film to be rapidly etched away and also enlarges the aforementioned fissures, whereby an edge attack of the metal conductor occurs. As a result of the film or coating ceasing to provide the desired insulation, various portions of the circuit may be connected together rather than being insulated from each other whereby a short will result.

When utilizing an aluminum film as the metal conductor line, the edge failure problem has not been as pronounced as when utilizing a molybdenum film, for example. This is because the edges of an etched aluminum film are not squared or sharp as are the edges of an etched molybdenum film but are normally tapered. Thus, the etched aluminum line does not present as pronounced an irregular surface as that presented by the step created by the molybdenum film. However, even the angled relation of the corners of the aluminum conductor film still prevent the desired edge cover of the metal conductor line by an insulating film.

The present invention satisfactorily solves the foregoing problem by providing a method in which the sputtering parameters are controlled to insure that a dielectric film is deposited on the irregular surface of the substrate to provide a relatively high edge protection. The irregular surface of the substrate is produced by the various metal films, for example, which have been deposited on the surface of the substrate to function as films, extending beyond the relatively smooth surface of the substrate.

In the present invention, a negative voltage of at least 60 volts is maintained on the surface of the dielectric film as it is deposited upon the irregular surface of the substrate. As a result, edge attack will not occur during the time when the film or coating, which is deposited by the present invention, is subjected to etching; if the sputtering is not so controlled, edge attack will occur during the time that the film is subjected to etching. As an example, edge attack will not occur for a minimumm of approximately six minutes when a silicon dioxide film, which has been deposited by the method of the present invention and has a thickness of 10,000A greater than the metal line thickness, is subjected to a 7:1 buffered solution (seven parts by volume of 40% $NH_4F$ to one part by volume of 48% HF) while this same solution will cause edge attack of a silicon dioxide film, which is not sputtered in accordance with the method of the present invention and of the same thickness, to be subjected to edge attack in less than ten seconds.

By maintaining the negative voltage on the film during its deposition, the substrate is caused to act like a cathode whereby the material, which is sputtered onto the substrate from the target, it sputtered therefrom as well as from the target. This results in a relatively low sticking coefficient or high resputtering rate. This causes the vertical surface of the stepped metallic film to be coated with the film or coating so that the film or coating provides a relatively high edge protection.

The negative voltage may be maintained on the film by utilizing a magnetic field normal to the surface of the substrate having a strength of at least fifty gauss with an argon sputtering gauge pressure of 10 millitorr or less in which the argon sputtering pressure is read on a Pirani gauge calibrated for air. The correction factor for argon gas is approximately 1.55 so that the gauge pressure must be multiplied by 1.55 to produce the absolute pressure of the argon.

Another apparatus for maintaining a negative voltage of at least 60 volts on the surface of the deposited film is to utilize an adjustable impedance between a substrate holder and ground whereby the substrate holder plate is subjected to this large negative voltage of at least 60 volts. In this apparatus, the argon pressure does not have to be maintained relatively low.

An object of this invention is to provide a method for sputtering a coating on an irregular surface of a substrate in which the coating provides a relatively high edge protection.

Another object of this invention is to provide a method of sputter depositing a coating over an irregular surface having an improved edge protection.

The foregoing and other objects, features, and advantage of the invention will be more apparent from the following more particular description of the preferred embodiment of the invention as illustrated in the accompanying drawings.

Figure 1:
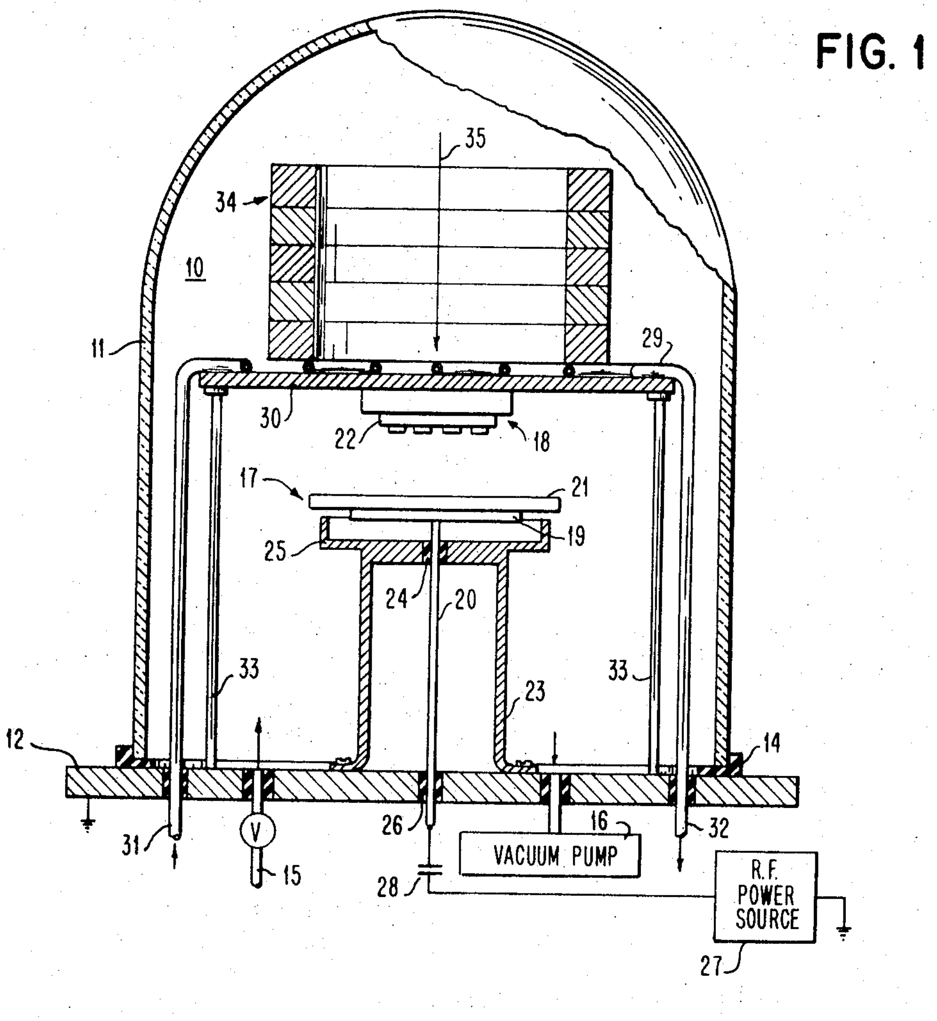
FIG. 1 is a vertical sectional view of an RF sputtering apparatus for carrying out the method of the present invention.

Referring to the drawings and particularly FIG. 1 there is shown an RF sputtering apparatus in which a magnetic field is provided normal to the surface of the substrate. The RF sputtering apparatus also may have the argon gas pressure regulated as desired. Accordingly, the RF sputtering apparatus of FIG. 1 permits control of both the magnetic field strength and the pressure of the argon gas within the partially evacuated chamber whereby the desired negative voltage may be exerted on the surface of the film deposited on the irregular surface of the substrate.

The RF sputtering apparatus of FIG. 1 is of the type more particularly shown and described in the copending patent application of Pieter D. Davidse et al, Ser. No. 514,853, filed Dec. 20, 1965, now U.S. Pat. No. 3,525,680, and assigned to the same assignee as the assignee of the present application. As shown in FIG. 1, the RF sputtering apparatus includes a low pressure gas ionization chamber 10, which is within a bell jar 11 and a base plate 12. A gasket 14 is disposed between the jar 11 and the base plate 12 to provide a vacuum seal.

A suitable inert gas such as argon, for example, is supplied to the chamber 10 from a suitable source by conduit 15. The gas is maintained at the desired low pressure within the chamber 10 by a vacuum pump 16, which communicates with the interior of the chamber 10.

The chamber has a cathode 17 and an anode 18 supported therein. It should be understood that the terms "cathode" and "anode" are employed merely for convenience herein. As more particularly described in U.S. Pat. No. 3,369,991 to Davidse et al, the cathode 17 and the anode 18 will function as such on the average over a cycle of the applied radio-frequency excitation.

The RF cathode 17 includes an electrode 19, which is supported on the upper end of a rod 20 and a target 21. The target 21, which comprises the material that is to be sputtered onto a substrate 22 having the irregular surface, is mounted on or positioned adjacent to the metal electrode 19. The substrate 22 is supported on the RF anode 18 and is disposed in spaced parallel relationship to the target 21.

The support rod 20 is surrounded by a hollow supporting column or post 23 and is insulated therefrom by an insulating bushing 24. The upper end of the hollow post or column 23 is flanged to form a metallic shield 25 that partially encloses or surrounds the electrode 19 adjoining the target 21 to protect the electrode 19 from unwanted sputtering as more particularly shown and described in the aforesaid Davidse et al patent.

Since the hollow post 23 is electrically conductive and is connected to the grounded base plate 12, the post 23 is maintained at ground potential. Accordingly, the shield 25 also is maintained at ground potential.

The lower end of the rod 20 passes through the grounded base plate 12 and is insulated therefrom by an insulating bushing 26. The rod 20 is electrically conductive and is connected to an RF power source 27 through a capacitor 28.

If desired, the electrode 19 and the shield 25 may be provided with cooling means (not shown) to control the temperature during operation. One suitable cooling means is shown and described in the aforesaid Davidse et al patent.

The RF anode 18 is cooled by a cooling coil 29, which is positioned adjacent a support plate 30 for the anode 18. The coolant is supplied to the coil 29 through an inlet pipe or tube 31 and leaves through an outlet pipe or tube 32.

The support plate 30 has the anode 18 secured thereto. The plate 30 is supported by posts 33, which electrically connected the anode 18 to the grounded base plate 12 whereby the anode 18 is grounded.

It should be understood that the shield 25 is positioned with respect to the electrode 19 in the manner more particularly shown and described in the aforesaid Davidse et al patent. Accordingly, when the RF power source 27 energizes the target electrode 19, the material of the target 21 is sputtered onto the substrate 22 in the manner more particularly shown and described in the aforesaid Davidse et al application. The target 21 may be formed of any material that produces an insulating material, which is stable at room temperature. One suitable example of the insulating material is silicon dioxide.

A set of toroidal permanent magnets 34 is stacked above the anode 18 to provide a steady magnetic field along the vertical axis 35 of the magnets 34. The vertical axis 35 is normal to the surface of the substrate 22. It is immaterial as to whether the polarity of direction of the magnetic field is up or down. Other suitable means may be provided to produce the steady magnetic field such as external electromagnets, for example.

In the aforesaid Davidse et al patent, the magnetic field is utilized to obtain higher deposition rates and to stabilize the glow discharge. This is accomplished by disposing the magnetic field normal to the surface of the target. Since the target 21 is disposed in substantially parallel relationship to the substrate 22 in the apparatus of FIG.1, the magnetic field produced by the set of magnets 34 not only permits the desired negative voltage to be produced on the surface of the film being deposited, when utilized with the proper argon pressure within the chamber 10, but also still gives higher deposition rates and stabilizes the glow discharge.

An edge protection of 50 percent is considered necessary for acceptable passivation in integrated circuit design. In the practice of the method of the invention it is critical that negative voltage be at least 60 volts. The negative D.C. voltage produced on the surface of the object being coated with a dielectric is influenced by the RF power applied across the cathode and anode electrodes, the gas pressure in the chamber, and the flux density of the magnetic field that is normal to the surface of the target. A guide to the correlation between these parameters can be expressed as follows:

$$\frac{\text{Power (watts/cm.}^2) \times \text{flux density (Gauss)}}{\text{Pressure (millitor-gauge)}} \geq 40$$

This correlation holds generally when the power density is in the range of 1 to 5 watts/cm², the flux density is in the range of 50–150 gauss, and the pressure gauge is in the range of 2–10 millitorr. Satisfying the above correlation will result in the formation of a dielectric film over an irregular surface of a quality which can be characterized having an edge protection of at least 50 percent. The definition of "edge protection" is discussed in detail below. As will be evident, the thickness of the deposited film must exceed the thickness of the metal film being covered for the edge protection characterization to be meaningful. probe The application of a magnetic field to a sputtering apparatus, is known to the art. However, the field was used to promote or enhance ionization within the chamber by increasing the distance of the electron travel between electrodes. Prior to this invention it was believed unknown that a negative voltage would develop on the surface of a dielectric with the applicaton of a magnetic field. Further, the end effect, namely the improved dielectric film quality was unexpected.

When using an RF sputtering apparatus of the type shown in FIG. 1 to sputter silicon dioxide from a target onto a silicon substrate having molybdenum thin film patterns thereon to produce an irregular surface on the substrate, tests have been run to determine when edge attack of the silicon dioxide film occurs. These tests were made by connecting the positive side of a DC source to the silicon substrate side remote from the surface having the molybdenum film thereon. The negative side of the DC source was connected to a probe above the top of the silicon dioxide film which covers the molybdenum thin film pattern. Surrounding areas of the silicon dioxide film were blocked off by using black wax. Then, a drop of 7:1 buffered HF solution (seven parts by volume of 40% $NH_4F$ to one part by volume of 48% HF) was placed on the sample so as to make contact with the test area and the negative probe simultaneously.

A 10K ohm resistor was disposed in series with the lead from the negative side of the DC source to the test area. The drop of etchant, which is the 7:1 buffered HF solution, etches at about 24A per second at room temperature and maintains a constant etch rate for up to approximately 800 seconds.

During the tests, the current remained essentially zero until the line edges of the molybdenum film were exposed. This resulted in a rapid increase in the current. When the rapid increase in current occurred, edge attack occurred so that the time for edge attack to occur could be readily determined.

Therefore, the thickness of the glass removed before edge attack can be calculated from a knowledge of the etch rate and the time that expired before a rapid increase in current occurred, which indicated a penetration through the film. The formula for determining percent edge protection is:

$$\%\text{ edge protection} = \frac{100\times\text{thickness of glass removed before edge attack}}{\text{original glass thickness}-\text{metal thickness}}$$

This characterization is valid when the thickness of the deposited film is at least 1000A greater than the thickness of the metal film.

With the foregoing test apparatus, the following edge attack times were obtained from a silicon substrate with molybdenum film steps thereon in which silicon dioxide was sputtered thereon while the substrate was mounted on a 1/16 inch thick quartz spacer and a magnetic field strength of 60 gauss was exerted normal to the surface of the substrate:

| Argon Sputtering Pressure (millitorr-gauge) | Time to Edge Attack in Sec. |
|---|---|
| 0.8 | 380 |
| 1.2 | 380 |
| 3.0 | 350 |
| 3.8 | 150 |
| 5.0 | 6.5 |

Figures 2, 3:
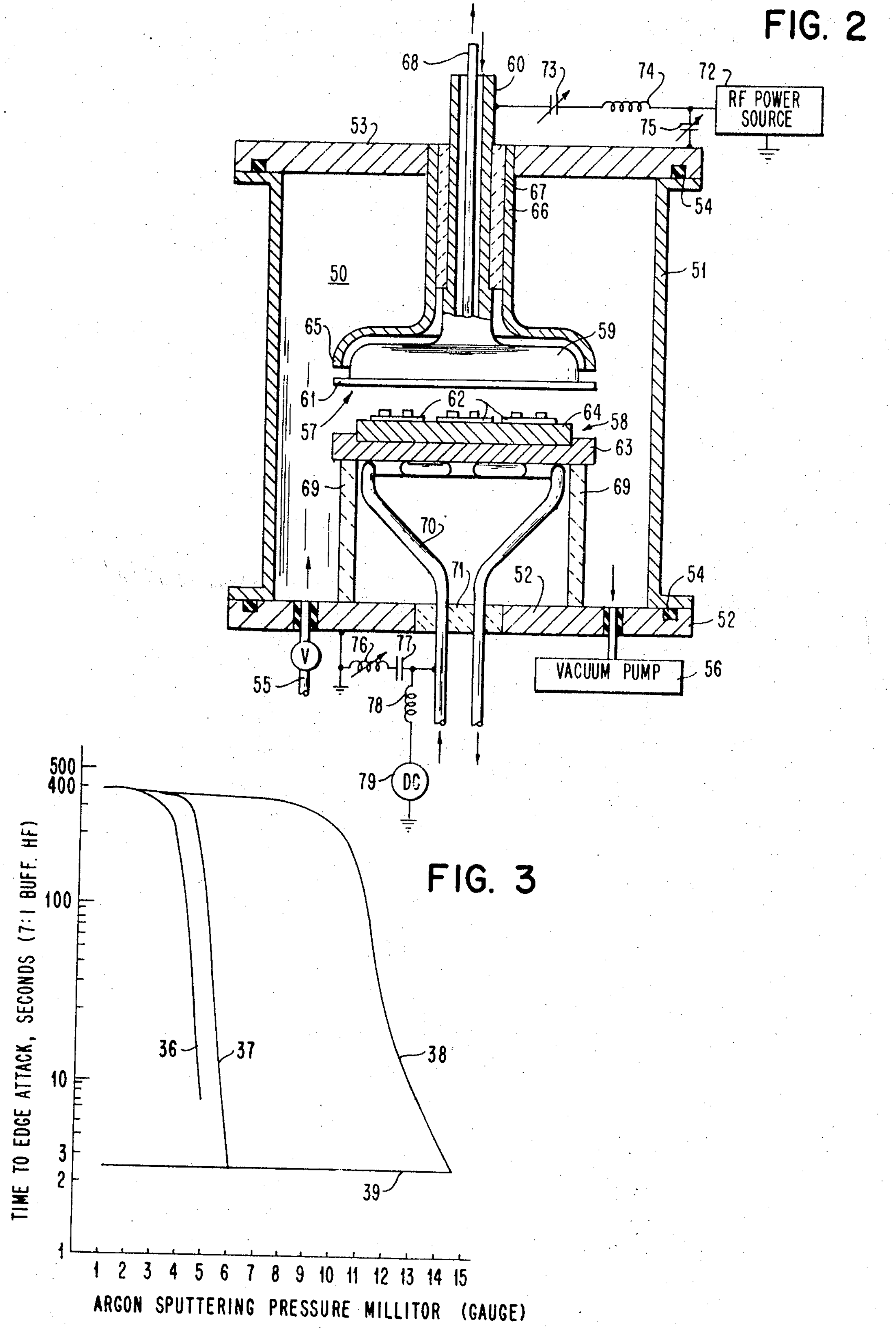
FIG. 2 is a vertical sectional view of another RF sputtering apparatus for carrying out the method of the present invention.
FIG. 3 is a graph showing the relationship of the time to edge attack in seconds as a function of argon sputtering pressure at various magnetic field strengths.

The foregoing results are shown in FIG. 3 as curve 36. It should be understood that the absolute pressure of the argon is equal to the product of the gauge pressure and 1.55 as previously mentioned.

With a substrate of silicon disposed on the holder, using gallium to provide thermal contact between the substrate and the holder, and silicon dioxide sputtered on the substrate with the substrate at a temperature of 250°C and a magnetic field strength of 64 gauss exerted normal to the surface of the substrate, the following edge attack times were obtained:

| ARGON SPUTTERING PRESSURE (millitorr-gauge) | TIME TO EDGE ATTACK IN SEC. |
|---|---|
| 4.2 | 350 |
| 6.0 | 2.5 |

These results are shown in FIG. 3 as curve 37.

With a substrate of silicon disposed in a gallium backed mode and silicon dioxide sputtered on the substrate with the substrate at a temperature of 250°C and a magnetic field strength of 108 gauss exerted normal to the surface of the substrate, the following edge attack times were obtained:

| Argon Sputtering Pressure (millitorr-gauge) | Time to Edge Attack in Sec. |
|---|---|
| 7.4 | 350 |
| 10.2 | 240 |
| 12.6 | 12 |
| 15 | 2.4 |

The foregoing results are shown in FIG. 3 as curve 38.

The substrates also were tested with the silicon dioxide film being deposited without any magnetic field. Varying of the pressure did not change the time to edge attack, and this time was approximately 2.5 seconds for all pressures. The foregoing results are indicated by curve 39 in FIG. 3.

Thus, by providing a magnetic field normal to the irregular surface of the substrate, the time to edge attack may be substantially lengthened by controlling both the strength of the magnetic field and the pressure of the argon within the chamber. Thus, as the strength of the magnetic field is increased, a higher argon pressure may be utilized and still obtain the same edge attack life as when using a lower pressure with a lower magnetic field strength. Furthermore, for a given magnetic field strength, decreasing the argon sputtering pressure increases the edge attack life. It should be understood that the curves 36–39 were produced with a constant power density of about 3.4 watts/square centimeter.

Additionally, another parameter that may be utilized to produce a desired negative potential on the deposited film is to vary the input power. Thus, by increasing the power with a given magnetic field strength and a given argon sputtering pressure, the negative potential on the film is increased. Accordingly, a higher argon sputtering pressure may be utilized for a given magnetic field strength when the input power is increased to produce the same edge attack life.

Tests were run in which a molybdenum disk was supported on a 7 mil quartz spacer that rested on a grounded support within a partially evacuated chamber. Gallium was disposed between the disk and the quartz spacer. The upper surface of the molybdenum disk had a silicon substrate mounted thereon with gallium therebetween. By connecting a lead to the molybdenum disk, a potential was measured during sputtering with the structure disposed within the partially evacuated chamber.

Under the following conditions, tests were run with an input power density of 2.5 watts/square centimeter and a magnetic field of 0 gauss. With these conditions and an untuned system, the floating potential of the substrate, as determined from the molybdenum disk, at various argon gauge pressures was as follows:

| Argon Sputtering Pressure (millitorr-gauge) | Floating Potential (volts) |
|---|---|
| 10 | +1.5 |
| 9 | +3.4 |
| 8 | +2.7 |
| 7 | +4.2 |
| 6 | +4.8 |
| 5 | +5.0 |
| 4 | +4.6 |
| 3 | +2.8 |
| 2 | −5.0 |
| 1 | unstable |

Figure 4:
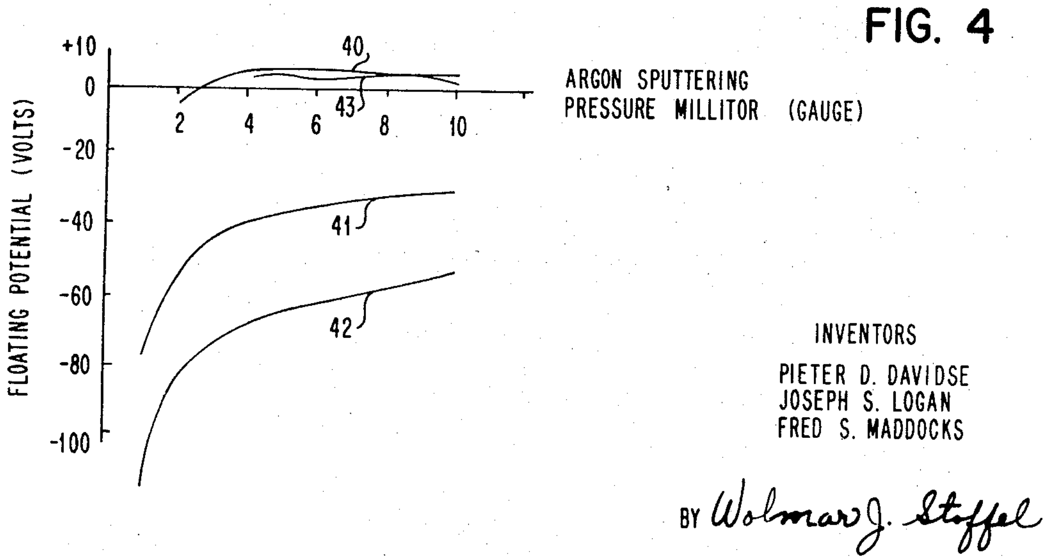
FIG. 4 is a graph showing the relationship of the voltage of the deposited film as a function of argon sputtering pressure, magnetic field strength, and input power.

These results are indicated by curve 40 in FIG. 4. It should be understood that the floating potential of the substrate is related to the negative voltage on the surface of the film being deposited.

Tests also were run with the same input power density of 2.5 watts/square centimeter but with a magnetic field strength of 60 gauss normal to the surface of the substrate. The results of these tests are as follows:

| Argon Sputtering Pressure (millitorr-gauge) | Floating Potential (volts) |
|---|---|
| 10 | −29 |
| 9 | −28.5 |
| 8 | −30.0 |
| 7 | −31.5 |
| 6 | −33.0 |
| 5 | −34.0 |
| 4 | −37.0 |
| 3 | −42.0 |
| 2 | −54.0 |
| 1 | −78.0 |

The foregoing results are indicated on curve 41 in FIG. 4.

Tests also were conducted with the input power density being increased to 4.5 watts/square centimeter and the magnetic field strength remaining at 60 gauss normal to the surface of the substrate. The following results were obtained:

| Argon Sputtering Pressure (millitorr-gauge) | Floating Potential (volts) |
|---|---|
| 10 | −50.0 |
| 9 | −55.0 |
| 8 | −56.0 |
| 7 | −58.0 |
| 6 | −62.0 |
| 5 | −63.0 |
| 4 | −65.0 |
| 3 | −71.0 |
| 2 | −81.0 |
| 1 | −112.0 |

The foregoing results are shown in FIG. 4 as curve 42.

Tests also were run with no magnetic field and an input power density of 4.5 watts/square centimeter The following results were obtained:

| Argon Sputtering Pressure (millitorr-gauge) | Floating Potential (volts) |
|---|---|
| 10 | +3.8 |
| 9 | +3.4 |
| 8 | +2.5 |
| 7 | +1.8 |
| 6 | +1.5 |
| 5 | +3.6 |
| 4 | +2.1 |

The foregoing results are indicated in FIG. 4 as curve 43.

A study of the curves 40 and 43 in FIG. 4 shows that there is insufficient negative voltage on the substrate and, thus, on the surface of the film being deposited to produce a film with a relatively long edge attack life when there is no magnetic field applied irrespective of the power utilized and the argon sputtering pressure.

A study of the curves 41 and 42 discloses that sufficient negative potential can be obtained on the substrate and, thus, on the surface of the film being deposited when a magnetic field is employed normal to the surface of the substrate being coated. However, the curves 41 and 42 show that a much higher sputtering pressure may be utilized when the power is increased. For example, a negative voltage of 60 volts with a power input of 2.5 watts/square centimeter at a magnetic field strength of 60 gauss requires a sputtering pressure of slightly less than 2 millitorr (see curve 41) whereas increasing the power to 4.5 watts/square centimeter while maintaining the same magnetic field strength of 60 gauss permits the sputtering pressure to be greater than 6 millitorr (see curve 42) and still obtain the desired negative voltage of 60 volts.

If the magnetic field strength were increased for a given input power, the same negative potential could be obtained with a still higher sputtering pressure. That is, an increase in the magnetic field strength permits an increase in the sputtering pressure to obtain the same negative voltage and, therefore, the same edge attack time. Thus, the argon pressure may be substantially higher when the magnetic field strength is increased for a given power or when the power is increased for a given magnetic field strength. Accordingly, utilization of curves of the type shown in FIG. 4 may be employed to produce the desired negative voltage on the film being deposited while appropriately selecting the argon sputtering pressure, the magnetic field strength, and the input power.

As shown by curve 36 in FIG. 3, an increase in argon sputtering pressure of approximately 2 millitorr can result in transition from no edge attack to severe edge attack. Thus, there is a critical relation of the magnetic field strength and the argon sputtering pressure to insure that the desired negative voltage appears on the surface of the deposited film when the power is constant.

While the curve 36 illustrates that severe edge attack occurs on a silicon substrate when silicon dioxide is sputtered thereon at an argon pressure of 5 millitorr and a magnetic field strength of 60 gauss with the substrate mounted by floating on 1/16 inch thick quartz spacers, no edge attack would occur if such a substrate were mounted in a gallium backed mode and maintained at a temperature of 250°C even with an argon sputtering pressure of 6 millitorr. Thus, the mode of mounting the substrates also is a factor as to when edge attack occurs. Accordingly, by mounting the substrate in a gallium backed mode rather than a floating mode, the negative voltage on the surface of the film may be produced with a higher argon sputtering pressure for a specific magnetic field strength.

While the curve 37 was plotted from information in which silicon dioxide was sputtered on a silicon substrate having a temperature of 250°C and mounted in a gallium backed mode, the temperature of the substrate does affect when the desired negative voltage is obtained on the surface of the film being deposited. Thus, edge attack decreases when a higher substrate temperature is utilized during sputtering. While a sputtering pressure no greater than 5 millitorr is needed to prevent edge attack when the substrate temperature is 250°C during sputtering with a magnetic field strength of 64 gauss, the sputtering pressure may increase to at least 6 millitorr without edge attack when the substrate temperature is maintained at 400°C during sputtering. However, a sputtering pressure no greater than 2 millitorr is required to prevent edge attack when the substrate temperature is maintained at 100°C during sputtering.

The tests also indicated that edge attack is a function of the spacer thickness when the substrates are floating on quartz of glass spacers during sputtering of the silicon dioxide on the surface thereof. This was determined by sputtering silicon dioxide on substrates that were gallium backed and maintained at 250°C, on substrates floating on 0.010 inch spacers, and on substrates floating on 0.062 inch spacers during a single run. The argon pressure was 4 millitorr with a magnetic field strength of 64 gauss normal to the surface of the substrates. Tests disclosed that immediate edge 0.062 inch spacers while no edge attack was noted in the sample substrates floating on 0.010 inch spacers or the sample substrates mounted in a gallium backed mode and maintained at a temperature of 250°C.

While the tests were conducted utilizing a 7:1 buffered HF solution, it should be understood that other etchants could be employed. Of course, this would change the time required for edge attack to occur. However, the same relative results would be produced irrespective of the etchant. Likewise, if the film were other than silicon dioxide, different times would be required for edge attack of the film by the 7:1 buffered HF solution.

Referring to FIG. 2, there is shown another RF sputtering apparatus for carrying out the method of the present invention. The RF sputtering apparatus is of the type more particularly shown and described in the copending patent application of Joseph S. Logan, Ser. No. 668,114, filed Sept. 15, 1967 now U.S. Pat. No. 3,617,459, and assigned to the same assignee as the assignee of the present application. The sputtering apparatus of FIG. 2 utilizes a variable impedance between a substrate holder and ground to maintain a negative voltage on the surface of the deposited film.

As shown in FIG. 2, the RF sputtering apparatus includes a low pressure gas ionization chamber 50, which is formed within a cylindrical member 51 of conductive material, an electrically conductive base plate 52, and an electrically conductive top plate 53. Annular seals 54 are utilized to insure a tight seal between the base plate 52 and the cylindrical member 51 and between the top plate 53 and the cylindrical member 51.

A suitable inert gas such as argon, for example, is supplied to the chamber 50 from a suitable source by a conduit 55. The gas is maintained at the desired low pressure within the chamber 50 by a vacuum pump 56, which communicates with the interior of the chamber 50.

The chamber 50 has an RF cathode 57 supported therein. The meaning of this term has previously been described. It should be understood that the grounded parts of the apparatus function as the RF anode.

The cathode 57 includes an electrode 59, which is supported by a tube 60, and a target 61. The target 61, which comprises the material that is to be sputtered onto a plurality of substrates 62, is supported by the electrode 59. The substrates 62 are supported by a substrate holder 58, which comprises a support plate 63 and an insert plate 64. The insert plate 64 is seated in a recess in the support plate 63.

A shield 65 is mounted at the lower end of an electrically conductive hollow post 66 and in partial surrounding relationship to the electrode 59. The details of the shield 65 are more particularly shown and described in the aforesaid Davidse et al patent.

The tube 60 is insulated from the hollow post 66, which surrounds the tube 60, by an insulating sleeve 67, which is formed of a suitable insulating material such as glass or ceramic, for example. Since the post 66 is connected to the upper plate 53 and in direct electrical contact therewith, the post 66 is maintained at ground potential since the plate 53 is at ground. Accordingly, the shield 65 is grounded.

Coolant for the electrode 59 is supplied between the inner surface of the tube 60 and the outer surface of a tube or pipe 68, which is surrounded by the tube 60 and concentric therewith. After circulating through the electrode 59 in a manner such as that more particularly shown and described in the aforesaid Davidse et al patent, for example, the coolant leaves through the outlet tube 68.

The support plate 63 of the substrate holder 58 is supported in spaced relation to the base plate 52 by legs 69 of suitable insulating material. Thus, the substrate holder 58 is electrically insulated from the base plate 52.

An electrode and cooling coil 70 makes electrical contact with the support plate 63 and also provides means to control the temperature of the support plate 63, the insert plate 64, and the substrates 62. The coil 70 is introduced into the chamber 50 through an insulating seal 71 in the base plate 52. The temperature of the support plate 63, which is the substrate holder electrode, is maintained by circulating water or other coolant through the coil 70 as indicated by the arrows in FIG. 2.

An RF power source 72 is electrically connected to the electrode 59 to apply an RF voltage potential across the electrode 59. A suitable impedance matching circuit is connected between the RF power source 72 and the electrode 59. The circuit includes a variable capacitor 73, an inductance 74, and a second variable capacitor 75 connected between the power source 72 and the top plate 53. The circuit provides means to compensate for the impedance of the power supply conduit to maintain the desired phase of the voltage and current delivered to the target electrode 59.

A variable impedance is connected between the grounded base plate 52 and the coil 70. Since the coil 70 is electrically connected to the support plate 63, the impedance controls the negative DC potential on the surface of the deposited film.

The variable impedance includes a variable inductance 76 and a capacitor 77. In order to monitor the voltage on the support plate 63, a shunt inductance 78 and a DC meter 79 are connected in series between ground and the coil 70.

As more particularly shown and described in the aforesaid Logan application, the voltage on the support plate 63 is maintained at a sufficiently negative potential to improve certain qualities of the insulating film deposited on the substrates. In the present invention, the voltage is maintained sufficiently negative to insure a low sticking coefficient on the surface of the substrates 62. Thus, while the aforesaid Logan application discloses the voltage being less than −40 volts, the present invention contemplates a requirement that the voltage be at least −60 volts to produce the desired results.

Tests were conducted to determine the amount of edge protection produced when a film was deposited on a substrate with the substrate maintained at a negative DC voltage by the apparatus of FIG. 2. The substrate was maintained at a negative DC voltage of 80 volts. The input power density was 2.5 watts/square centimeter and there was no magnetic field. The relation between the argon sputtering pressure and edge protection were as follows:

| Argon Sputtering Pressure (millitorr-gauge) | Edge Protection (percent) |
|---|---|
| 6 | 82–88 |
| 8 | 78–86 |
| 10 | 86–90 |
| 15 | 75–85 |

As previously mentioned, the absolute argon pressure is equal to the product of gauge pressure and 1.55. The formula for determining edge protection is percent Edge Protection =

$$100 \times \frac{\text{Thickness of glass removed before edge attack}}{\text{Original glass thickness} - \text{metal thickness}}$$

The foregoing tests disclose that no magnetic field is required to product the desired negative potential on the film being deposited when the substrate is tuned to the desired negative voltage and that the edge protection is independent of the variation in pressure. Any of the edge protection produced by the tests is satisfactory. Short edge attack life exists when the edge protection is 10 percent, for example.

While the present invention has been described with respect to sputtering silicon dioxide onto a silicon substrate utilizing RF sputtering, it should be understood that the present invention may be utilized wherever it is desired to sputter a film onto an irregular surface in which the film provides a relatively high edge protection. Thus, other suitable insulating materials, metallic materials, or semiconductive materials could be deposited onto the irregular surface of a substrate by utilizing the method of the present invention. For the metals and semiconductors, DC sputtering could be employed.

It should be understood that the substrate may be an integrated circuit, for example. While the dielectric film has been described as being silicon dioxide, other suitable examples are silicon nitride and aluminum oxide.

It should be understood that the thickness of the deposited film must be sufficient to cover the irregular surfaces of the substrate. The thickness of the deposited film will depend upon the thicknesses of the irregularities, the etchants to which the film is to be subjected, and the material for the deposited film. For dielectric films, for example, the coating must have a minimum thickness of 7000A when the thickness of the metallic film being covered is 6000A.

An advantage of this invention is that it insures proper insulating cover for etched metal lines on a substrate. Another advantage of this invention is that it substantially eliminates the problem of edge attack of sputtered insulating films. A further advantage of this invention is that it increases the production yield and reliability of integrated and thin film circuits.

As used in the claims, "irregular surface" means a surface having portions parallel to each other in spatial relation to each other and connected by portions at an angle to the parallel portions.

While the invention has been particularly shown and described with reference to a preferred embodiment thereof, it will be understood by those skilled in the art that various changes in form and details may be made therein without departing from the spirit and scope of the invention.

What is claimed is:

1. A method for RF sputter depositing a dielectric film on a substrate over a metallic line on the substrate surface in elevated relief forming an irregular top surface; the film to provide edge protection over the line of at least 50%, the method comprising:

disposing the substrates with a partially evacuated chamber having an inert gas therein;

applying a high frequency alternating voltage between a dielectric target within the the chamber and the substrate to cause the material from the target to be sputter onto the irregular surface of the substrate;

inducing a negative DC voltage of at least 60 volts on the surface of the dielectric film as it is deposited by connecting an impedance between a holder for the substrate and a third conductive surface within the chamber, the magnitude of the impedance being consistent with the magnitude and phase of the alternating voltage, said impedance to provide a control of the relative RF voltage between the holder for the substrate and the third electrode;

and maintaining the induced negative DC voltage on the surface of the dielectric film as it is deposited to produce a thickness of at least 1000A greater than the thickness of the metallic line so that the edge protection produced over the metallic line by the dielectric film is at least 50 percent.

2. The method according to claim 1 in which the substrate is an integrated circuit.

3. The method according to claim 1 in which the film is silicon nitride.

4. The method according to claim 1 in which the film is aluminum oxide.

5. The method according to claim 1 in which the film is silicon dioxide.

6. A method for RF sputter depositing a dielectric film on a substrate over a metallic line on the substrate surface in elevated relief forming an irregular top surface, the film to provide edge protection over the line of at least 50 percent, the method comprising:

disposing the substrates within a partially evacuated chamber having an inert gas therein;

applying a high frequency alternating voltage between a dielectric target within the chamber and the substrate to cause the material from the target to be sputter deposited onto the irregular surface of the substrate;

inducing a negative DC voltage of at least 60 volts on the surface of the dielectric film as it is deposited, said negative DC voltage induced by applying a magnetic field substantially perpendicular to the plane of the holder for the substrate, the negative voltage on the surface of the film is induced by controlling the pressure of the inert gas within the chamber in cooperation with the strength of the magnetic field and the power input, the relationship between power input, magnetic field, and pressure in accordance with the expression $$\frac{\text{Power density (watts/cm.}^2) \times \text{flux density (Gauss)}}{\text{pressure (millitors-gauge)}} = 40$$

when power density is in the range of 1 to 5 watts/cm², flux density is in the range of 50 to 150 gauss, and pressure gauge is in the range of 2 to 10 millitorrs, and maintaining the induced negative DC voltage on the surface of the dielectric film as it is deposited to produce a thickness of at least 1000 A greater than the thickness of the metallic line so that the edge protection produced over the metallic line by the dielectric film is at least 50 percent.

7. The method according to claim 6 in which the film is silicon dioxide.

* * * * *